(12) United States Patent
Hochrein et al.

(10) Patent No.: US 9,371,248 B2
(45) Date of Patent: Jun. 21, 2016

(54) GLASS ELEMENT WITH HIGH SCRATCH TOLERANCE

(71) Applicant: Schott AG, Mainz (DE)

(72) Inventors: Oliver Hochrein, Mainz (DE); Inge Burger, Wiesbaden (DE); Irmgard Westenberger, Mainz (DE); Jochen Alkemper, Klein-Winternheim (DE); Gerd Rudas, Jugenheim (DE); Katharina Alt, Mainz (DE); Gordon Kissl, Heidesheim (DE); Gunther Paulus, Mainz (DE)

(73) Assignee: SCHOTT AG, Mainz (DE)

( * ) Notice: Subject to any disclaimer, the term of this patent is extended or adjusted under 35 U.S.C. 154(b) by 0 days.

(21) Appl. No.: 14/249,825

(22) Filed: Apr. 10, 2014

(65) Prior Publication Data
US 2014/0309097 A1 Oct. 16, 2014

(30) Foreign Application Priority Data
Apr. 10, 2013 (DE) .......................... 10 2013 103 574

(51) Int. Cl.
*C03C 3/093* (2006.01)
*C03C 21/00* (2006.01)

(52) U.S. Cl.
CPC ............... *C03C 3/093* (2013.01); *C03C 21/002* (2013.01)

(58) Field of Classification Search
CPC ........ C03C 3/093; C03C 3/091; C03C 21/002
See application file for complete search history.

(56) References Cited

U.S. PATENT DOCUMENTS

| 3,954,487 | A | 5/1976 | Gliemeroth et al. |
|---|---|---|---|
| 5,277,946 | A | 1/1994 | Nagai et al. |
| 2009/0142568 | A1 | 6/2009 | Dejneka et al. |
| 2010/0246016 | A1 | 9/2010 | Carlson et al. |
| 2010/0279068 | A1 | 11/2010 | Cook et al. |
| 2010/0285275 | A1 | 11/2010 | Baca et al. |
| 2010/0291353 | A1 * | 11/2010 | Dejneka et al. ............... 428/192 |
| 2011/0183118 | A1 | 7/2011 | Lamberson et al. |
| 2012/0277085 | A1 | 11/2012 | Bookbinder et al. |
| 2014/0099501 | A1 * | 4/2014 | Yamamoto et al. ........... 428/335 |

FOREIGN PATENT DOCUMENTS

| WO | 2009070237 A1 | 6/2009 |
|---|---|---|
| WO | 2011022661 A2 | 2/2011 |
| WO | 2012074954 A1 | 6/2012 |
| WO | WO 2012124757 A1 * | 9/2012 |

OTHER PUBLICATIONS

German Office Action dated Oct. 24, 2013 corresponding to German Application No. 10 2013 103 574.4 with English translation.

* cited by examiner

*Primary Examiner* — Elizabeth A Bolden
(74) *Attorney, Agent, or Firm* — Ohlandt, Greeley, Ruggiero & Perle, LLP (57) ABSTRACT

A glass element is provided that is made of a glass having $SiO_2$, $Al_2O_3$, $B_2O_3$, and $Na_2O$. The glass has a scratch tolerance that when scratches of 1 mm length are introduced using a Knoop diamond indenter which presses upon a surface of the glass with a force of 4 Newton and is displaced along the surface with a traverse speed of 0.4 mm/s, not more than 20% of the scratches have a noticeable width including visible chipping of more than 25 μm. In some embodiments, the glass, after chemical tempering, has sodium ions that are at least partially exchanged for potassium ions so that a compressive stress zone is provided at the surface of the glass. The compressive stress is at least 700 MPa and an exchange depth of alkali ions is at least 25 μm.

19 Claims, 6 Drawing Sheets

GLASS ELEMENT WITH HIGH SCRATCH TOLERANCE

CROSS REFERENCE TO RELATED APPLICATIONS

This application claims benefit under 35 U.S.C. §119(a) of German Patent Application No. 10 2013 103 574.4, filed Apr. 10, 2013, the entire contents of which are incorporated herein by reference.

BACKGROUND OF THE INVENTION

1. Field of the Invention

The invention relates to a high-strength cover glass that is chemically tempered or temperable by ion exchange and exhibits excellent scratch behavior. The glass may be used as a protective cover glass in electronic devices, such as smart phones, tablet PCs, navigation devices, etc.

2. Description of Related Art

Smart phones, tablet PCs, navigation devices, etc. are generally operated via touch screens nowadays. For protecting the display and the sensor, thin ion-exchanged (chemically tempered) glasses can be used. Chemical tempering of the glass is achieved by exchanging small alkali ions (e.g. $Na^+$) for larger homologs (e.g. $K^+$). In this manner, a stress profile is generated in the glass.

After the ion exchange there will be a compressive stress zone in the region near the surface of the glass and a tensile stress zone in the inner region. The compressive stress zone in the glass surface obtained by the ion exchange is accompanied by a strong increase in bending strength of the glasses, which can be demonstrated impressively by mechanical fracture tests (e.g. 4 point bending test, falling ball experiments, double ring test). To this end, it would be beneficial to achieve sufficiently high compressive stresses of more than 700 MPa in the surface and exchange depths of more than 25 μm by the ion exchange. Below, the designation CS will be used for the Compressive Stress in the surface of the glass, and the designation DoL (Depth of Layer) will be used for the exchange depth of alkali ions. The CS and DoL values can be measured by a photoelastic method. Suitable for this purpose, for example, is the FSM 6000 measuring device of Luceo Co., Ltd., Japan.

Glasses of the system of alkali alumosilicates have turned out to be particularly well ion-exchangeable and resistant. Currently, various glasses of this type are used as cover glasses to protect touch displays of electronic devices. The composition of the glasses has a strong influence on the values of compressive stress CS in the surface of the glass and on the exchange depth DoL (Depth of Layer) resulting from the ion exchange.

SUMMARY

The scratch tolerance of a glass largely depends on the prestressing profile, but also on the glass composition. In laboratory tests for investigating glasses according to the invention and comparative samples, scratches were produced in the glass surface using a diamond indenter (e.g. Knoop), with a predefined force (0.1 to 10 N, most preferably 4N) and a predefined traverse speed (0.05 mm/s to 1 mm/s, most preferably 0.4 mm/s). The scratches produced by the laboratory setup correspond to "real" scratches that occur with everyday use. This was shown by studies of scratches in the cover glasses of a multitude of used smartphones. The diamond of the indenter always produces a scratch in the glass, that is to say none of the glasses proves to be completely "resistant" to scratches. Therefore, otherwise than e.g. in WO 2009/070 237 A1, instead of the term "scratch resistance" the more appropriate term "scratch tolerance" will be used for the glasses of the invention.

The following damage can be observed:

Type a): A visually relatively inconspicuous scratch is produced. The damage to the glass is limited to the scratch trace. No other additional cracks are produced, either laterally or vertically into the material, and no chipping or spalling. With a scratch load of 4 N, the scratch trace typically has a width of less than 20 μm, the depth of damage is less than 7 μm. Such a scratch can be regarded as "innocent", a glass which has such a pattern of damage after the scratch test is identified as "scratch-tolerant".

Type b): The scratch shows marked chipping and/or spalling (resulting from lateral cracks), making it visually conspicuous. However, there are no cracks running into the material perpendicularly to or at a large angle to the surface, which would strongly reduce the breaking strength. With a scratch load of 4 N, the scratch trace has a width of at least 100 μm, typically of about 200 μm, the depth of damage is less than 7 μm.

Type c): The scratch is visually inconspicuous, showing no lateral cracks or chipping, however, a crack has formed running into the glass. The latter greatly reduces the breaking strength of the glass. With a scratch load of 4 N, the scratch trace typically has a width of <20 μm, the depth of damage is <20 μm.

Type d): The scratch shows marked chipping and/or spalling (resulting from lateral cracks), making it visually conspicuous. Additionally, there are cracks vertically running into the material, which strongly reduce the breaking strength. With a scratch load of 4 N, the scratch trace has a width of at least 100 μm, typically of about 200 μm, the depth of damage is less than 20 μm.

The studies in conjunction with the invention revealed a strong correlation between the damage behavior and the prestressing profile. Not chemically tempered glasses, or those with a low DoL (<20 μm) often show type c) or type d) scratches. Glasses with large exchange depths (>25 μm) often have type b) damage.

In order to ensure the strength properties advantageous for the application of the thin cover glasses which typically have a thickness from 0.4 to 1.1 mm, not only a compressive stress of >700 MPa in the surface area is favorable, but also an exchange depth of >25 μm. With these exchange depths, however, often visually conspicuous scratches arise when subjected to a scratching load, which is due to chipping along the scratch trace.

An object of the present invention is to provide a glass which in addition to high values of compressive stress exhibits a high scratch tolerance.

WO 2009/070 237 A1 discloses chemically temperable glasses which in addition to a high toughness allegedly exhibit scratch resistance. In this document, toughness and brittleness B are used for evaluation. As to brittleness B, $B=HV/K_{Ic}$, wherein HV denotes Vickers hardness. $K_{Ic}$ and B are material parameters that can be derived from indenter measurements. The exact measurement methodology is not described in WO 2009/070 237 A1, in particular figures of relative humidity are missing. However for this purpose, as is known in the art, crack formation may be observed under application of a normal force. According to the investigations for the present invention, however, such measurements are not transferable to the scratching behavior of a glass. When scratching over a glass surface with an indenter, different load distributions (e.g. shear forces) will be caused in the glass, resulting in different damage patterns.

WO 2012/074954 A1 describes alkali-free and hence chemically non-temperable glasses of high scratch resistance. The scratch tests described therein correspond to those performed in the investigation of the glasses according to the invention. Here again it is observed that upon scratching medial and lateral damage patterns may occur. While the former lead to a strong reduction in strength, the latter result in visually striking chipping. However, as already mentioned, this refers to alkali-free and therefore per se chemically not temperable glasses.

WO 2011/022661 A2 describes chemically tempered, break and scratch resistant glasses. The tendency to form visually conspicuous scratches is investigated using an experimental setup similar to the setup described in the present invention (Knoop indenter, 5N, 0.4 mm/s). However, the force employed in WO 2011/022661 A2, namely >5N, is greater than in the investigations of the present invention (4N). The chemical tempering is specified by very low minimum values (CS≥400 MPa, and DoL≥15 μm). As mentioned above, with such a low compressive stress and the specified experimental conditions, chipping will rarely occur upon scratching.

For the necessary strength, however, such a low compressive stress will not be sufficient. Unlike described in WO 2011/022661 A2, values of CS≥700 MPa and DoL>25 μm are preferred for the tempered glasses of the invention to provide for a good handling strength. Like already described above in the discussion of WO 2009/070237 A1, in WO 2011/022 661 A2 the tendency to form strength-reducing cracks is again studied by impression tests using an indenter, and not by scratch tests with an indenter. Again, forces and stresses caused in the glass by the two different experiments are not transferable.

Furthermore, the glasses of WO 2011/022661 A2 are specified with a Young's modulus of <69 MPa. When used as a cover glass, however, very thin glasses are typically employed (from about 0.5 to 1.1 mm), therefore, a higher stiffness is advantageous in this case.

U.S. Pat. No. 5,277,946 A discloses an ion exchangeable, boron containing glass. However, there is no information as to the scratch tolerance of the glass.

An ion exchangeable, boron containing glass is disclosed in U.S. Pat. No. 3,954,487 A. Information on the scratch tolerance of the glass are not given.

An object of the present invention is to provide a high-strength glass element which is more resistant than chemically tempered glass sheets currently available on the market. Thus, such a glass element should exhibit an improved durability as compared to known glass sheets.

If, after having been subjected to scratching stress, the glass does not show visually conspicuous chipping nor strength-reducing cracks that extend into the glass perpendicular thereto or at a high angle, this improves the breaking strength even after prolonged use under frictional or scratching stresses. Further, even in its non-tempered state such a glass should exhibit a significantly reduced tendency to form cracks or chipping when subjected to scratching stress.

This will be beneficial upon cutting and processing of the edges, since damage to the edges (chipping) often occur in these processes.

A glass according to the invention even has advantages in manufacturing, as it will be less affected by visually conspicuous scratches caused by a contact with rollers, for example. Moreover, due to the high temperability, any scratches occurring will be less strength-reducing.

The present invention provides chemically tempered or temperable glass elements which are distinguished by an excellent durability. The features of the invention are specifically set forth in the independent claims. Advantageous embodiments and modifications of the invention are specified in the dependent claims.

According to a first aspect, the invention accordingly provides a glass element of a glass comprising $SiO_2$, $Al_2O_3$, $B_2O_3$, and $Na_2O$, wherein at the surface of the glass element sodium ions have been exchanged for potassium ions, at least partly, so that a compressive stress zone is provided at the surface so that the glass element is chemically tempered, wherein the compressive stress in the surface of the glass is at least 700 MPa and the exchange depth of the alkali ions is at least 25 μm, wherein a scratch tolerance of the glass element is such that when scratches of 1 mm length are introduced using a Knoop diamond indenter which presses upon the glass surface with a force of 4 Newton and is displaced along the surface of the glass element with a traverse speed of 0.4 mm/s, preferably along the major edge of the rhombohedral Knoop tip, not more than 25% of the scratches, preferably not more than 20%, most preferably not more than 10% will have a noticeable width including visible chipping of more than 25 μm. Even percentages of not more than 2% of visible scratches may be achieved.

Moreover, cracks vertically extending from the surface into the glass are largely or completely avoided in a glass according to the invention. In one embodiment of the invention, the scratch tolerance of the glass element is such that when scratches of 1 mm length are introduced using a Knoop diamond indenter which again presses upon the surface of the glass with a force of 4 Newton and is displaced along the surface of the glass element with a traverse speed of 0.4 mm/s, preferably along the major edge of the rhombohedral Knoop tip, none of the scratches will have a crack running from the surface into the glass to a depth of more than 50 μm, preferably more than 40 μm, more preferably more than 30 μm in the glass. This particularly applies even if a plurality of such scratch tests are performed, preferably between 10 and 50 scratch tests. Thus, the risk that a strongly strength-reducing scratch might be created is very low.

Preferably, a glass and a glass element of a glass are provided with a composition comprising the following components, in mole percent:

| | |
|---|---|
| 56-70% | $SiO_2$; |
| 10.5-16% | $Al_2O_3$; |
| 2.5-9% | $B_2O_3$; |
| 10-15% | $Na_2O$; |
| 0-5% | $K_2O$; |
| 0-6% | MgO; |
| 0.1-2.1% | $ZrO_2$; |
| 0-2.1% | $TiO_2$; |
| 0-0.1% | $CeO_2$; |
| 0-0.3% | $SnO_2$; |
| 0-1.5% | $P_2O_5$; |
| 0-2% | ZnO; |
| 0-<0.2% | $Li_2O$; and |
| 0-2%, | preferably 0-1% of other components, such as refining agents, chlorides, sulfates, CaO, SrO, BaO. |

The content of fluoride is less than 0.2 mol %, preferably <0.05 mol %. Most preferably, the glasses of the invention are free of fluorine. A glass with the latter content of fluorine of less than 0.05 mol % can be referred to as fluorine-free.

Hereinafter, unless otherwise specified, the percentages of components of the glass composition are likewise given in mole percentages.

The invention also relates to a method for producing a chemically tempered glass element, in which a glass element is produced from a glass exhibiting a scratching tolerance according to the invention, preferably with the composition as specified above, and is then stored in a salt bath at a temperature of at least 300° C. for a duration of at least 1.5 hours, which salt bath contains potassium ions, and wherein sodium ions in the glass of the glass element at the surface thereof are exchanged for potassium ions of the salt bath, at least partly, wherein the exchange depth of the alkali ions is at least 25 µm, so that a compressive stress zone is generated at the surface of the glass element, with a compressive stress at the surface of at least 700 MPa, and the glass element is chemically tempered.

Within the composition range mentioned above, the following composition range is preferred:

| | |
|---|---|
| 57-69% | $SiO_2$; |
| 11-15.6% | $Al_2O_3$; |
| 3-8% | $B_2O_3$; |
| 11-15% | $Na_2O$; |
| 1-4.5% | $K_2O$; |
| 0-5% | MgO; |
| 0.1-1.5% | $ZrO_2$; |
| 0-1.5% | $TiO_2$; |
| 0-0.1% | $CeO_2$; |
| 0-0.3% | $SnO_2$; |
| 0-1.5% | $P_2O_5$; |
| 0-2% | ZnO; and |
| 0-1% | of other components, such as sulfates, CaO, SrO, BaO, refining agents, chlorides. |

Most preferably, the content of $Li_2O$ is less than 0.05%. Accordingly, these glasses may be referred to as $Li_2O$-free.

Within the above composition range, the following range of molar composition is most preferred:

| | |
|---|---|
| 59-68% | $SiO_2$; |
| >12-15.6% | $Al_2O_3$; |
| 3-8% | $B_2O_3$; |
| 11-15% | $Na_2O$; |
| 1-4.5% | $K_2O$; |
| 0-5% | MgO; |
| 0.1-1.5% | $ZrO_2$; |
| 0-1.5% | $TiO_2$; |
| 0-0.1% | $CeO_2$; |
| 0-0.3% | $SnO_2$; |
| 0-1.5% | $P_2O_5$; |
| 0-2% | ZnO; and |
| 0-1% | of other components, such as sulfates, CaO, SrO, BaO, refining agents, chlorides. |

The compositions mentioned above are distinguished by a specific balance of the individual glass components that cause a compressive stress with a large exchange depth and at the same time a high scratch tolerance.

Moreover, the high scratch tolerance of such a borate-containing alumosilicate glass according to the invention is even shown by the not yet tempered glass. This is beneficial, since damage can be avoided already during pre-processing of the glass prior to chemical tempering, such as when being cut to the intended format.

Therefore, the invention also provides a chemically temperable glass element of a glass comprising $SiO_2$, $Al_2O_3$, $B_2O_3$, and $Na_2O$, wherein a scratch tolerance of the glass element without or prior to chemical tempering is such that when scratches of 1 mm length are introduced using a Knoop diamond indenter which presses upon the surface of the glass with a force of 4 Newton and is displaced along the surface of the glass element with a traverse speed of 0.4 mm/s, not more than 20% of the scratches will have a noticeable width including visible chipping of more than 25 µm. Also, similar to the tempered glasses, the scratch tolerance of the non-tempered glass element likewise is such that when scratches of 1 mm length are introduced using a Knoop diamond indenter which presses upon the surface of the glass with a force of 4 Newton and is displaced along the surface of the glass element with a traverse speed of 0.4 mm/s, none of the scratches will have a crack running into the glass to a depth of more than 50 µm in the glass. In the not yet tempered glass the scratch tolerance is even better.

Since in the investigations of the scratching behavior small defects at the surface may have a great effect, a test on single samples is not sufficient for an accurate evaluation of the scratching behavior. Therefore, 50 scratch operations were performed for each glass type and sample. All samples were subjected to the same pre-treatment (polishing, washing, ion exchange in a melt of 100% $KNO_3$ at 420° C. for 6 h).

The glasses of the invention are well suited for ion exchange; according to one embodiment of the invention the achievable tempered parameters are CS>700 MPa, and DoL>25 µm. To obtain the prestressing profile, process temperatures between 380 and 460° C. are suitable, and processing times between 1 and 10 h.

Further, the glasses have glass transition temperatures of $T_g$>580° C. Since with sufficient stresses in the glass, relaxation processes in the glass become relevant even below glass transition, a high glass transition temperature $T_g$ is of relevance for chemical tempering and is a particular advantage.

Further, the glasses exhibit working points (viscosity of $10^4$ dPa·s) of ≤1300° C. Thus, the glasses can be melted in common types of melting troughs for special glasses, and hot forming can be accomplished by floating, drawing (updraw or downdraw), rolling, or overflow fusion.

$SiO_2$, as a majority and glass forming component, is important for stabilization of the network. This is advantageous in terms of sufficient chemical resistances of the glass, inter alia. Too low $SiO_2$ contents will lead to an increased tendency to devitrification. On the other hand, very high contents of $SiO_2$ imply high melting temperatures. Moreover, a glass with a high $SiO_2$ content will have a very dense structure, which is detrimental for ion exchange.

Alkali oxides ($Na_2O$, $K_2O$) and alkaline earth oxides (MgO, CaO, SrO, BaO) reduce scratch tolerance. This is probably due to the generation of non-bridging oxygen (NBO) in the glass structure.

On the other hand, these network modifiers are advantageous for the melting of the glass. However, it has been found that the proportion of alkaline earth oxides can be kept low. The presence of $Na^+$ and $K^+$ ions is important for ion exchange, an alkali-free glass cannot be chemically tempered. On the other hand, potassium ions are favorable for increasing the exchange depth. Therefore, the glasses of the invention have a certain content of $K_2O$.

Alkaline earth oxide MgO does not have a noticeable effect on ion exchange when used moderately. However, the heavy alkaline earth oxides (CaO, SrO, and BaO) as well as ZnO will hinder the latter if present in the glass in larger amounts (>2 mol %). These components are well balanced in the glasses of the invention, to allow for melting and ion exchange on the one hand, and to not decrease the scratch tolerance too much on the other. Therefore, according to one embodiment of the invention, the molar content of each of components CaO, SrO, and BaO is not greater than 0.1%, and the total content of components CaO, SrO, and BaO is not greater than 0.2%.

$Al_2O_3$ likewise improves the scratching behavior and has found to be beneficial for ion exchange. The latter was impressively shown when comparing the CS and DoL values of alkali alumosilicate glasses with those of soda lime variants. The former reached significantly higher values by the ion exchange. $Al_2O_3$ prevents formation of non-bridging oxygen (NBO) functions in the glass structure, which are caused in pure-silica glasses due to the network modifiers. However, $Al_2O_3$ significantly increases the melting point, and excessive amounts degrade the devitrification tendency and resistance to acids. In this respect, likewise, the composition of the glasses according to the invention achieves a good balance between a not too high softening point and a low devitrification tendency on the one hand, and a high scratch tolerance and good ion exchangeability on the other.

Generally, the glass composition of the invention permits to obtain a working point, i.e. the temperature at which the viscosity has a value of $10^4$ dPa·s, at a temperature of lower than 1300° C. Further, the glass transition temperature $T_g$ is typically greater than 580° C., preferably greater than 600° C.

$B_2O_3$ has a strongly positive influence on the scratching behavior, the same applies to the melting behavior. However, it hinders ion exchange. The latter may be compensated for by moderate use and balancing with other components (such as $Al_2O_3$).

According to one embodiment of the invention, a good balance of the two components $Al_2O_3$ and $B_2O_3$ is achieved by adjusting the total molar content of components $Al_2O_3$ and $B_2O_3$ in a range from 13% to 23%, preferably from 14% to 22%, more preferably from 15% to 21%, as an additional constraint to the composition ranges mentioned above.

$ZrO_2$ and $TiO_2$ appear to be more or less indifferent in terms of scratching behavior and ion exchange. However, larger amounts of titanium- or zirconium-containing components might be problematic in the melt, since they only slowly dissolve in the glass matrix. Large amounts may furthermore cause problems with devitrification. On the other hand, $TiO_2$ and $ZrO_2$ improve chemical resistances, especially the alkali resistance of the glass, which is important for the durability of the glass article. The alkali resistance plays a role in washing operations during manufacturing and also during the use of the tempered glass article. Therefore, according to one embodiment of the invention, at least one of components $ZrO_2$ and $TiO_2$ is included with at least 0.1 mole percent. A total molar content of components $ZrO_2$ and $TiO_2$ in a range from 0.1% to 2.1% is particularly preferred.

Further, good ion exchangeability accompanied by high chemical resistance is achieved by a balanced alkaline content. According to a preferred embodiment of the invention, the total molar content of components $Na_2O$ and $K_2O$ is in a range from 10% to 17%.

To achieve high scratch tolerance and at the same time high long-term stability of the prestressed region in the chemically tempered glass, it is furthermore advantageous if the total molar content of components $Al_2O_3$, $ZrO_2$, $TiO_2$ is in a range from 10.6% to 18.1%, preferably from 11.1% to 17.6%, more preferably in a range from >12.1% to 17%.

Other favorable constraints are derived in particular from proportions or quotients of the total contents of several specific components.

According to a first advantageous constraint for the composition of the glass, the quotient $(B_2O_3+Al_2O_3+ZrO_2)/(Na_2O+K_2O+MgO)$ of the total molar content of components $B_2O_3$, $Al_2O_3$, $ZrO_2$ and the total content of components $Na_2O$, $K_2O$, $MgO$ has a value in a range from 0.95 to 1.55, preferably in a range from 1.05 to 1.45.

As described before, components $B_2O_3$, $Al_2O_3$, and $ZrO_2$ in the numerator of the quotient specified above are favorable for good scratch tolerance and chemical resistance of the glass, that is, more generally, for its durability. By contrast, components $Na_2O$, $K_2O$, and $MgO$ in the denominator of the quotient decrease scratch tolerance and chemical resistance. High scratch tolerance and at the same time high ion exchangeability is achieved with a value of quotient $(B_2O_3+Al_2O_3+ZrO_2)/(Na_2O+K_2O+MgO)$ in a range from 1 to 1.5.

Another favorable constraint when choosing a composition is a quotient $B_2O_3/(Al_2O_3+ZrO_2)$ of the content of $B_2O_3$ and the total molar content of $Al_2O_3$ and $ZrO_2$ with a value in a range from 0.18 to 0.55, preferably in a range from 0.2 to 0.5, more preferably in a range from 0.22 to 0.47. In this manner, components which rather hinder ion exchangeability ($B_2O_3$), and those which are favorable for ion exchange ($Al_2O_3$), and in particular components which promote devitrification ($Al_2O_3$, $ZrO_2$) and components that counteract devitrification during processing ($B_2O_3$) are balanced to each other, so that a very well processable and well ion-exchangeable glass is obtained.

$P_2O_5$ has a favorable influence on the ion exchange, by adding $P_2O_5$ the negative influence of $B_2O_3$ thereon may partially be reduced. On the other hand, $P_2O_5$ is known to reduce the chemical resistance of glasses. During manufacturing, larger quantities of $P_2O_5$ may cause problems with evaporation. Small amounts of $P_2O_5$ have a positive effect on the devitrification behavior.

$CeO_2$ can be used as a redox active refining agent and for adjusting the redox ratio in the glass. The latter decisively influences the color of the glass.

$SnO_2$ may serve as a redox active, non-toxic refining agent (substitute for $As_2O_3$, $Sb_2O_3$).

Other refining agents contemplated (also in combination with $SnO_2$ and/or $CeO_2$) include halides or sulfates.

The component fluoride (F−) clearly has a negative effect on the scratching behavior. This is probably due to per se terminal (not bridging) fluoride functions in the glass structure. Furthermore, fluoride has a strong negative influence on ion exchange. Therefore, fluoride should be avoided as a component: All in all, a fluoride-free composition has more benefits than drawbacks.

Finally, glasses are preferred which are substantially free of coloring components, with a total content of coloring components, in particular of 3d transition metals with coloring ionic species, especially V, Cr, Mn, Fe, Ni, Co, Cu in any oxidation state of less than 0.1 mol %.

The glasses or glass elements according to the invention not only permit to achieve, after chemical tempering, a compressive stress in the surface of the glass of at least 700 MPa with an exchange depth of the alkali ions of at least 25 µm, but even higher values. In one embodiment of the invention, the compressive stress is at least 750 MPa, with an exchange depth of alkali ions of at least 30 µm, in particular even a compressive stress in the surface of more than 800 MPa and an exchange depth of the alkali ions of at least 35 µm can be achieved.

The exchange depth and consequently the depth of the compressive stress zone are even more important for scratch tolerance than the value of compressive stress, as will be explained below with reference to the exemplary embodiments. A large exchange depth tends to favor visually inconspicuous scratches, while low exchange depths and high compressive stresses may easily lead to visually much more noticeable scratches.

The main application of the glasses according to the invention in their tempered state is as a high-strength protective cover glass for electronic devices of the consumer sector, e.g. mobile phones, smartphones, tablet PCs, PCs with touch display, navigation devices, monitor devices, television sets), more generally as a protective glass for electronic devices with or without touch functionality. Due to its excellent mechanical properties, the glass is even suitable for harsh environmental conditions, such as for public displays and terminals, and for industrial displays, as well as in household items.

Especially when configured as a rather thick glass sheet, the tempered glass may be used as an (outer) glazing of road and rail vehicles, watercraft, and aircraft. For this purpose, a thickness of the glass of at least 1.5 millimeters is preferred. Glass sheets according to the invention may also be used as a protective glass or high-strength safety glass in the interior of vehicles, as well as in household appliances, and in this case it is also possible to use thinner glass of a thickness of less than 1.5 millimeters.

An inventive glass element may also be used as a headlight or lamp glazing.

Due to its mechanical properties, the glass is moreover suitable as a high-strength substrate material. Here, use as a substrate for solar cells or photovoltaic panels is considered, inter alia, and as a substrate for the magnetic layer of hard drive digital media.

Finally, a tempered glass sheet according to the invention may be used in combination with other layers, in particular as a laminate of safety glazing. For example, two or more glass element according to the invention may be laminated together to produce a high-strength safety glazing.

DETAILED DESCRIPTION

Figure 1:
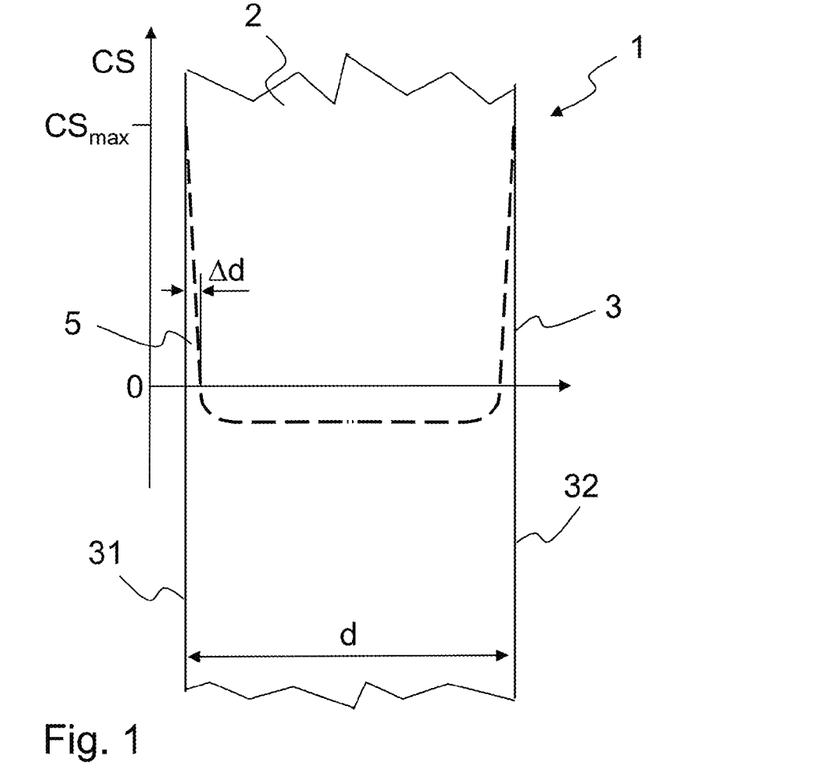
FIG. 1 shows a chemically tempered sheet-like glass article, and superimposed thereto a diagram of the mechanical stress profile in the glass article.

FIG. 1 illustrates a sheet-like glass element 1 according to the invention. The glass element made of a glass 2 has a surface 3 with two opposite faces 31, 32. Glass element 1 has been chemically tempered by exchanging sodium ions at the surface 3 to an exchange depth of Δd. Due to the ion exchange and the larger size of the potassium ions which are present in a higher concentration at the surface, a compressive stress zone 5 is established. A superimposed diagram shows the profile of compressive stress CS. The compressive stress decreases from its maximum value $CS_{max}$ at the surface 3 within a layer of thickness Δd and turns into a slight tensile stress in the inner regions of the sheet-like glass element. The layer of thickness Δd approximately corresponds to the compressive stress zone 5. The thickness d of glass element 1 preferably ranges from 0.4 to 1.1 millimeters. For such thin glasses the method of chemical tempering to increase strength is especially useful.

Glass elements according to the invention are produced by melting a glass of preferably the glass composition specified above and then forming the glass into a glass part in a hot forming step. A glass sheet is typically manufactured in a hot forming step. Suitable hot forming processes for this purpose are floating, updrawing or downdrawing, rolling, or overflow fusion. According to one embodiment of the invention, the glass sheet may already constitute the glass element of the invention. Preferably, however, the glass element is further processed, in particular in order to obtain glass sheets of an intended size. The further processing may additionally include introducing holes, recesses or depressions, for example by drilling or milling. The further processing, such as in particular the cutting to an intended format, or milling, drilling, etching, sand blasting, may be accomplished by at least one of the steps cutting, breaking, and grinding prior to the storage in a salt bath. If the glass element is formed by floating, subsequent polishing of the surface is advantageous in order to remove tin impurities.

Chemical tempering is then accomplished by storing in a salt bath which preferably comprises predominately $KNO_3$. Optionally, other potassium-containing components may be present in the salt bath, such as $K_3PO_4$, $K_2SO_4$, and KOH. A pure $KNO_3$ melt is preferred. In order to achieve a sufficiently high compressive stress and an exchange depth reaching as deep as possible, the glass element is stored in a hot potassium-containing molten salt of 300° C. minimum for at least 1.5 hours.

With reference to FIGS. 2 to 13, different patterns of scratches in the glass surface will be explained. In each case, for generating the damage pattern, scratches 9 were produced in the glass surface 3 using a diamond indenter with a predefined force of 4N and a traverse speed of 0.4 mm/s.

Figure 2:
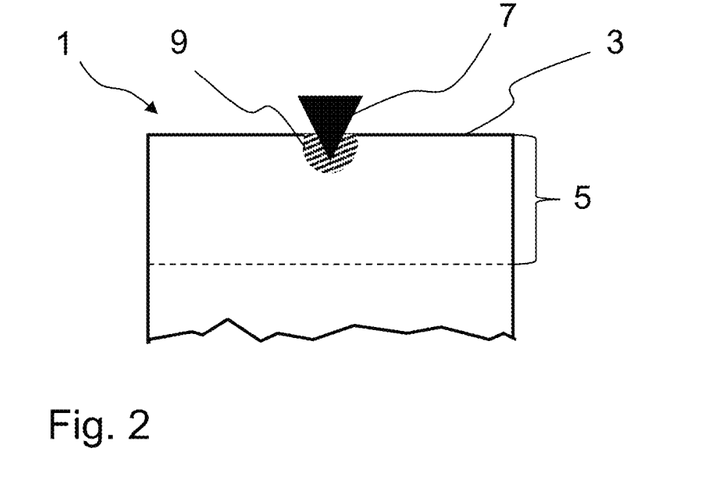
FIGS. 2 to 13 are schematic views and micrographs of different scratches in the glass surface.
Figure 3:
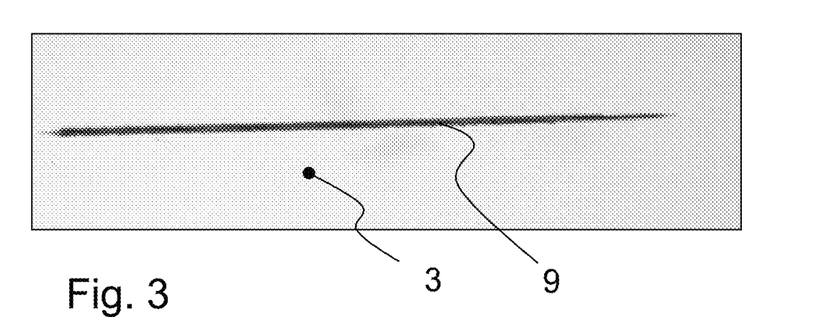
Figure 4:
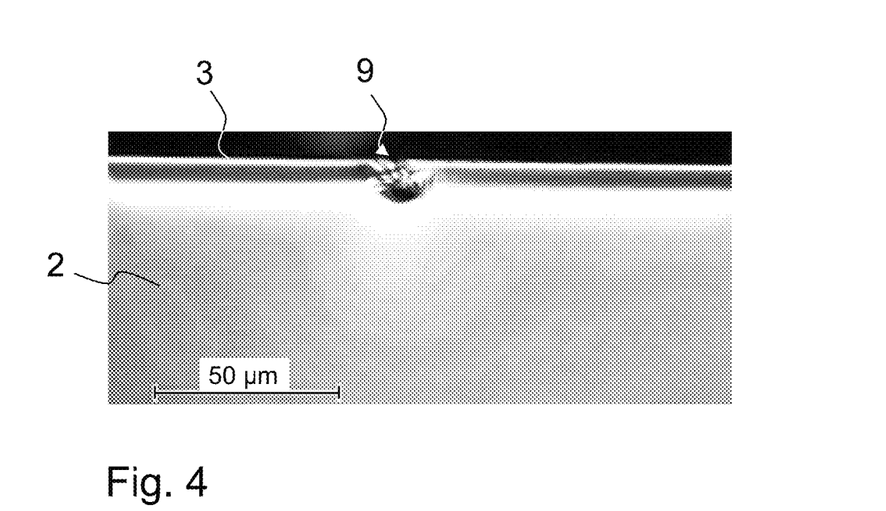

FIGS. 2 to 4 show a visually inconspicuous pattern of damage according to the type a) mentioned in the introductory part, in particular as it mainly occurs with the glasses according to the invention.

For this case, FIG. 2 schematically shows a cross-sectional view of the damage zone or scratch 9, which is introduced by indenter tip 7. The spatial extent of scratch 9 remains strictly limited to the trace of the indenter tip. Also, the depth of scratch 9 remains smaller than the typical exchange depth and the depth of compressive stress zone 5.

FIG. 3 additionally shows a top view photograph of such a scratch, FIG. 4 a cross-sectional photograph. Based on the image scale shown in FIG. 4 it becomes apparent that such a visually inconspicuous scratch 9 which was introduced into a glass of the invention using an indenter tip with the parameters specified above (contact force 4N, traverse speed of 0.4 mm/s) has a width and a depth of less than 30 microns.

Figure 5:
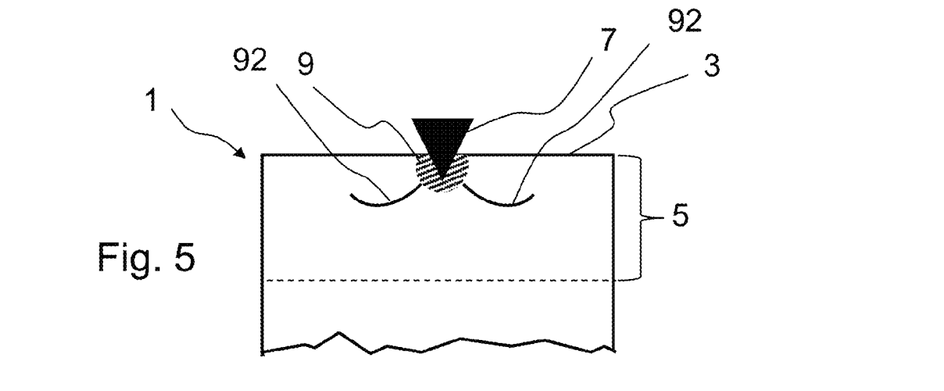
Figure 6:
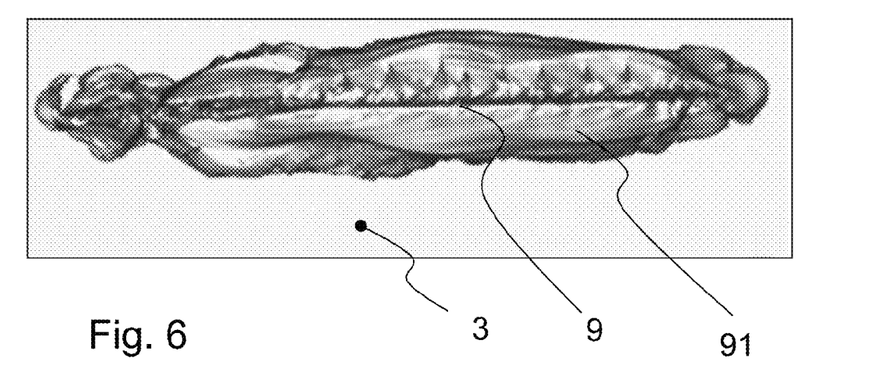
Figure 7:
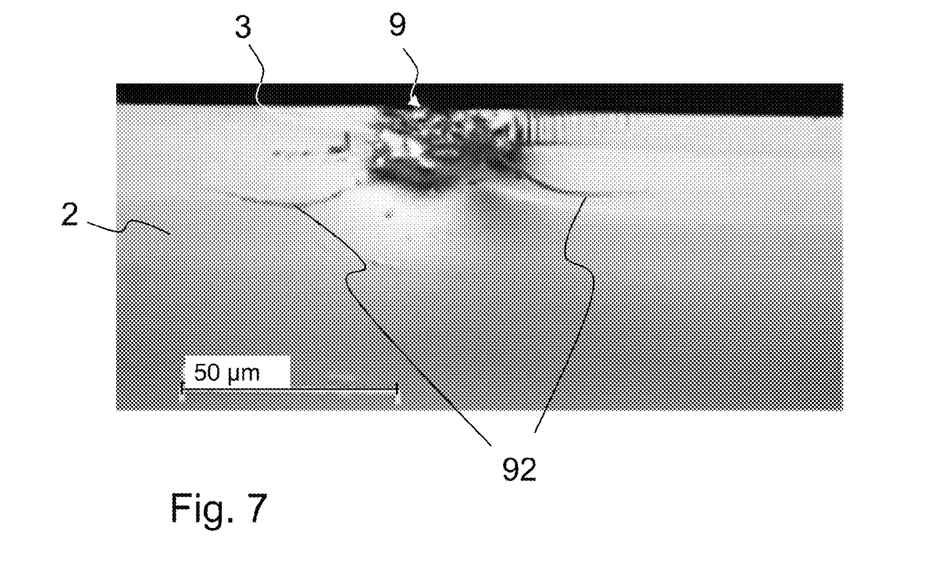

FIGS. 5 to 7 show a scratch of type b) in which marked chipping and spalling can be observed and which is visually striking therefore. Even such scratches may arise in the glass according to the invention when the indenter is moved over the surface with a contact force of 4N and a traverse speed of 0.4 mm/s, but these forms of scratches will occur much less frequently than in less scratch tolerant glasses.

FIG. 5, similar to FIG. 2, schematically illustrates the shape of scratch 9; FIG. 6 is a top view photograph of surface 3; and FIG. 7 is a cross-sectional photograph.

In the plan view (FIG. 6), chipping 91 of scratch 9 is clearly visible. This is caused by lateral cracks 92 which are indicated in the schematic cross section of FIG. 5 and can clearly be seen in the cross-sectional view of FIG. 7.

The chipping extends far along surface 3 transversely to the longitudinal extension of scratch 9 and so is visually striking. The lateral cracks still extend within compressive stress zone 5, so that at least the breaking strength achieved by chemical tempering is not significantly reduced. In particular because of the chipping 91 the visible width of the scratch is greater than 25 μm. Based on the scale shown in FIG. 7 it can be seen that the width of scratch 9 including chipping 91 is even larger than 100 μm. In glasses of the invention, also in the chemi cally tempered state, scratches of this type will be created only rarely in a scratch test with a Knoop indenter.

Figure 8:
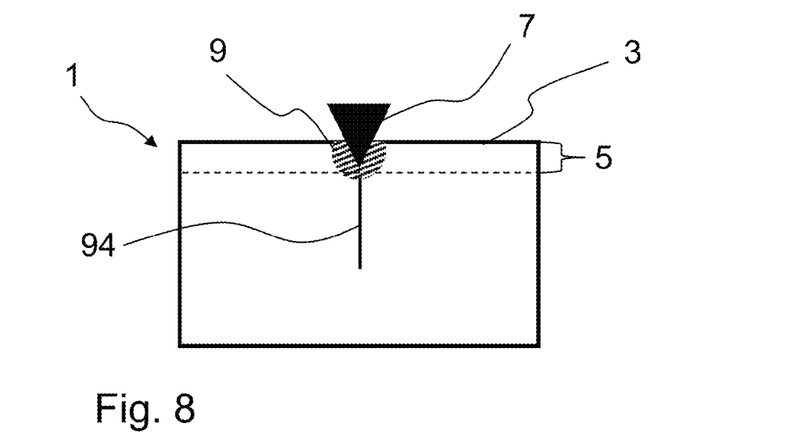
Figure 9:
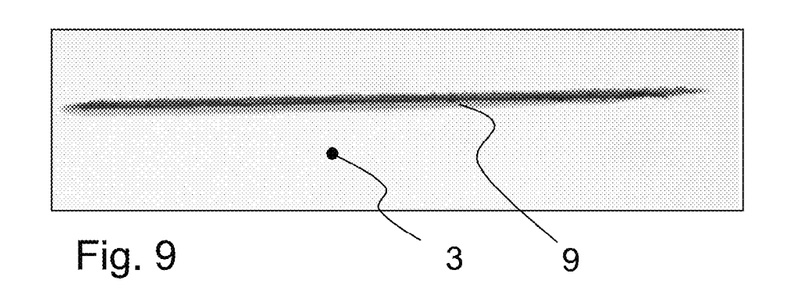
Figure 10:
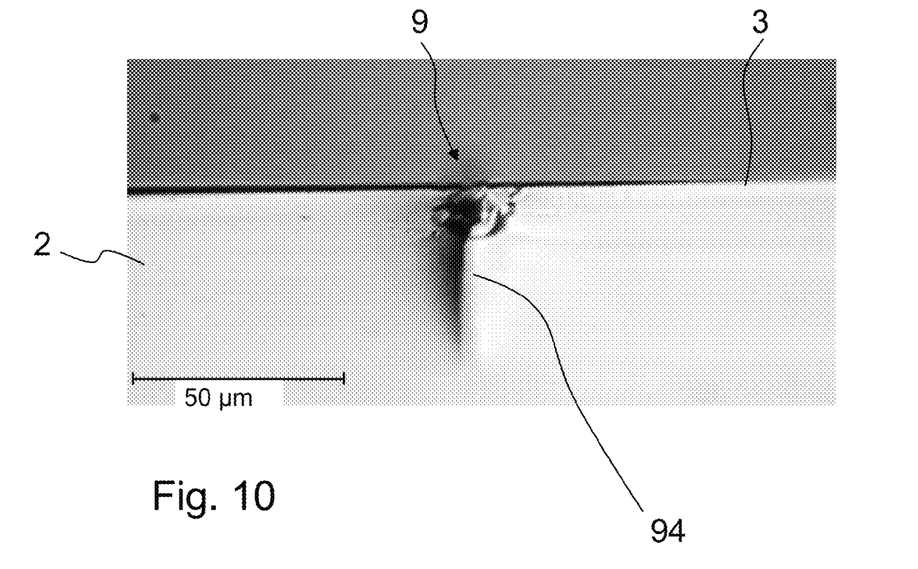

FIGS. 8 to 10 show a scratch of type c).

Scratch 9 is visually rather inconspicuous and does not show any lateral cracks or chipping, as can be seen from the top view photograph of FIG. 9. However, as schematically illustrated in FIG. 8 and as can be clearly seen from the cross-sectional photograph of FIG. 10, a crack 94 has formed, which is running into the glass. Crack 94, by extending into the glass, strongly reduces the breaking strength. Therefore, a scratch 9 of this type is very detrimental, despite of its low visibility. From FIG. 8 it can be seen that in this case scratch 9 penetrates into a depth beyond compressive stress zone 5. Just this then leads to a formation of the crack 94 running into the material. Therefore, it is of great advantage if the composition of the glass allows for a high exchange depth. In a chemically tempered glass element 1 according to the invention, therefore, the compressive stress in the surface 3 of glass 2 is at least 700 MPa, and in particular the exchange depth of alkali ions is at least 25 μm. Preferably, a compressive stress CS of at least 750 MPa and an exchange depth of alkali ions of at least 30 μm is achieved by appropriate processing parameters of tempering in the salt bath (especially in terms of storage duration). Even compressive stresses of greater than 800 MPa may be achieved, as will be described in the following examples. Moreover, an exchange depth of even more than 35 μm may easily be obtained with the inventive glasses, without limitation to the value of compressive stress.

Figure 11:
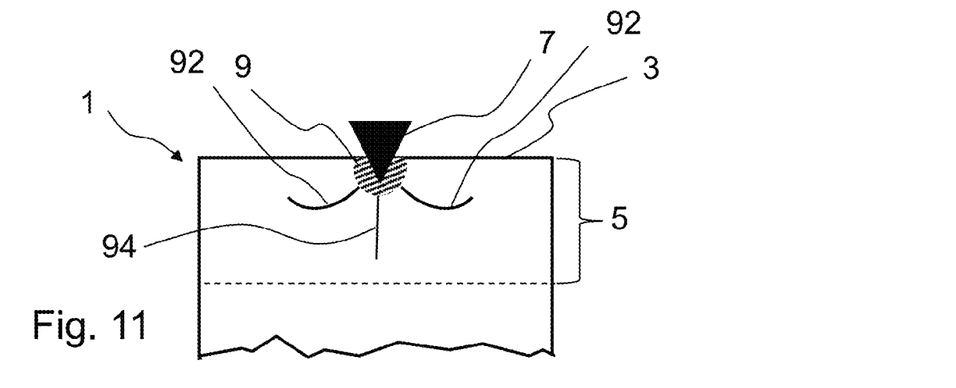
Figure 12:
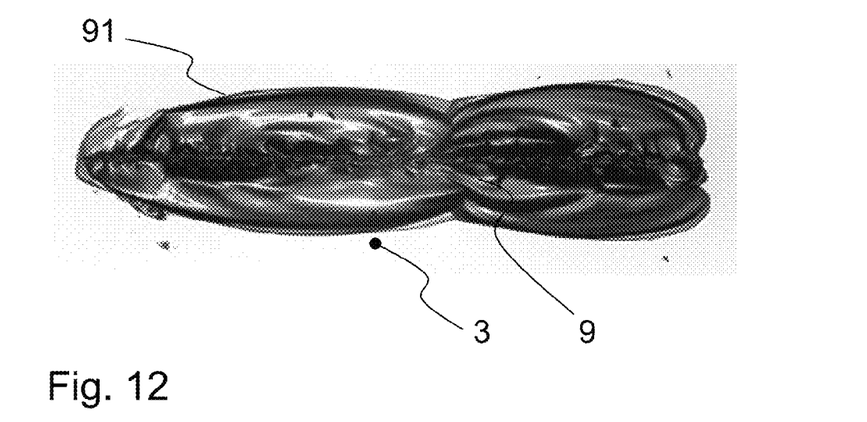
Figure 13:
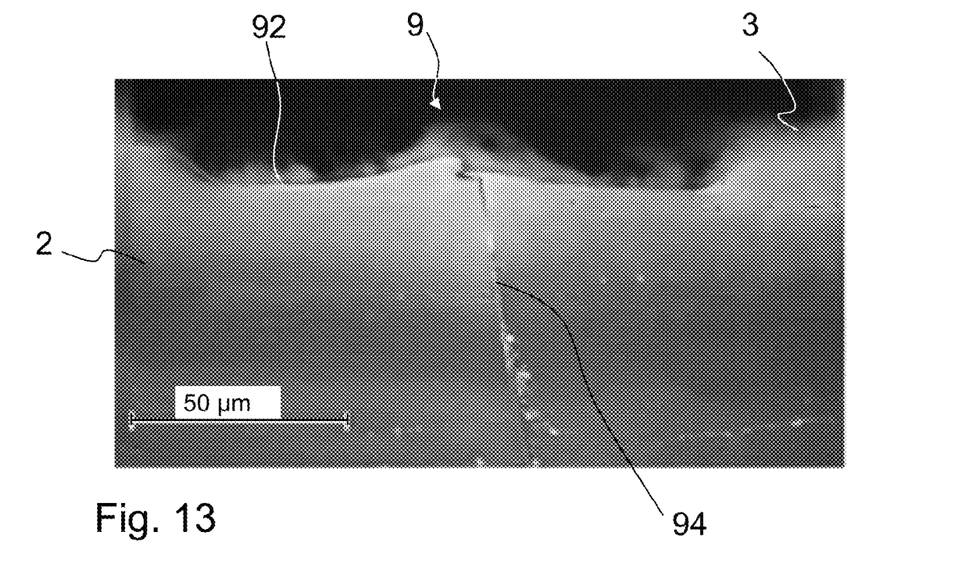

FIGS. 11 to 13 show a scratch of type d), in which marked chipping 91 can be seen, here even in form of spalling. In the cross-sectional photograph of FIG. 13, the spalling is clearly seen as a recess in the region of scratch 9. Thus, scratch 9 is visually striking, as can be seen in the top view photograph of FIG. 12. Even such scratches 9 may arise in the glass according to the invention when the indenter is moved over the surface with a contact force of 4N and a traverse speed of 0.4 mm/s, but these forms of scratches will occur much less frequently than in less scratch tolerant glasses. Additionally, as schematically illustrated in FIG. 11 and as can clearly be seen from the cross-sectional photograph of FIG. 12, a crack 94 has formed, which is running into the glass. Crack 94, by extending into the glass, strongly reduces the breaking strength.

Table 1 below lists the properties of five exemplary embodiments of chemically tempered glass elements according to the invention and their composition. All exemplary embodiments exhibit excellent scratch tolerance.

TABLE 1

| | | Sample | | | | |
|---|---|---|---|---|---|---|
| | | 1 | 2 | 3 | 4 | 5 |
| | | | | mol % | | |
| SiO$_2$ | | 60.0 | 59.4 | 60.3 | 61.3 | 61.7 |
| Al$_2$O$_3$ | | 15.5 | 15.0 | 15.0 | 15.0 | 15.0 |
| B$_2$O$_3$ | | 6.0 | 6.0 | 6.0 | 6.0 | 7.0 |
| Na$_2$O | | 11.1 | 11.2 | 12.0 | 12.0 | 12.5 |
| K$_2$O | | 3.3 | 4.4 | 3.3 | 3.3 | 3.3 |
| MgO | | 4.0 | 2.0 | 2.0 | 2.0 | 0.0 |
| ZrO$_2$ | | 0.1 | 2.0 | 1.5 | 0.5 | 0.5 |
| F | | | | | | |
| Total: | | 100.0 | 100.0 | 100.0 | 100.0 | 100.0 |
| Feature | Unit | | | | | |
| CTE | 10$^{-6}$/K | 8.19 | 8.58 | 8.47 | 8.63 | 8.91 |
| Tg | °C. | 599 | 617 | 618 | 601 | 584 |
| Density | g/cm$^3$ | 2.42 | 2.46 | 2.44 | 2.42 | 2.40 |
| T14.5 | °C. | 585 | 593 | 588 | 573 | 564 |
| T13 | °C. | 627 | 637 | 633 | 619 | 612 |
| T7.6 | °C. | 877 | 897 | 895 | 891 | 890 |
| T4 | °C. | 1260 | 1280 | 1283 | 1292 | 1306 |
| T3 | °C. | 1449 | 1464 | 1468 | 1482 | 1506 |
| T2 | °C. | 1716 | 1714 | 1723 | 1742 | 1782 |
| CS (100% KNO$_3$; 420° C./6 h) | Mpa | 867 | 905 | 961 | 932 | 932 |
| DoL (100% KNO$_3$; 420° C./6 h) | μm | 36.9 | 42.4 | 40.7 | 44 | 48 |
| Scratch test tempered samples | Number of visible defects from 50 scratches | 7 | 10 | 8 | 3 | 1 |
| Scratch test non-tempered samples | Number of visible defects of type b) or d) from 50 scratches | 5 | | 3 | | 1 |

Table 2 below lists the corresponding features of seven comparative examples C1, C2, . . . , C7:

TABLE 2

| | | Sample | | | | | | |
|---|---|---|---|---|---|---|---|---|
| | | C1 | C2 | C3 | C4 | C5 | C6 | C7 |
| | | | | | mol % | | | |
| SiO$_2$ | | 58.00 | 65.00 | 59.00 | 58.00 | 59.00 | 58.00 | 60.00 |
| Al$_2$O$_3$ | | 10.00 | 6.00 | 16.00 | 16.00 | 16.00 | 10.00 | 6.00 |
| B$_2$O$_3$ | | 0.00 | 0.00 | 0.00 | 2.50 | 0.00 | 6.00 | 0.00 |
| Na$_2$O | | 16.00 | 11.00 | 16.00 | 16.00 | 11.00 | 11.00 | 16.00 |
| K$_2$O | | 4.00 | 4.00 | 4.00 | 0.50 | 4.00 | 4.00 | 3.00 |
| MgO | | 12.00 | 12.00 | 4.00 | 4.00 | 7.00 | 10.00 | 12.00 |
| ZrO$_2$ | | 0.00 | 2.00 | 0.00 | 2.00 | 2.00 | 0.00 | 2.00 |
| F | | 0.00 | 0.00 | 1.00 | 1.00 | 1.00 | 1.00 | 1.00 |
| Total: | | 100.000 | 100.000 | 100.000 | 100.000 | 100.000 | 100.000 | 100.000 |
| Feature | Unit | | | | | | | |
| CTE | 10$^{-6}$/K | 10.66 | 8.73 | 10.35 | 8.3 | 8.16 | 8.85 | 10.21 |
| Tg | °C. | 590 | 635 | 615 | 642 | 686 | 546 | 565 |
| Density | g/cm$^3$ | 2.4986 | 2.5165 | 2.4763 | 2.504 | 2.5284 | 2.4519 | 2.5471 |
| T14.5 | °C. | 551 | 608 | 603 | 634 | 671 | 529 | 550 |
| T13 | °C. | 584 | 643 | 646 | 673 | 709 | 561 | 582 |

TABLE 2-continued

| | | Sample | | | | | | |
|---|---|---|---|---|---|---|---|---|
| | | C1 | C2 | C3 | C4 | C5 | C6 | C7 |
| | | | | | mol % | | | |
| T7.6 | °C. | 788 | 853 | 897 | 903 | 937 | 736 | 775 |
| T4 | °C. | 1111 | 1185 | 1283 | 1251 | 1286 | 1092 | 1081 |
| T3 | °C. | 1276 | 1352 | 1472 | 1420 | 1459 | 1272 | 1237 |
| T2 | °C. | 1512 | 1593 | 1739 | 1654 | 1702 | 1546 | 1462 |
| CS (100% KNO$_3$; 420° C./6 h) | MPa | 1118.0 | 949.9 | 1226.9 | 1489.8 | 1031.3 | 828.5 | 1087.2 |
| DoL (100% KNO$_3$; 420° C./6 h) | μm | 38.4 | 28.9 | 55.6 | >55 | 38.1 | 25.5 | 28.9 |
| Number of visible defects of type b) or d) from 50 scratches, tempered glass | | 49 | 46 | 50 | 41 | 50 | 46 | 46 |
| Number of visible defects of type b) or d) from 50 scratches, non-tempered glass | | | 50 | | 39 | | 50 | |

In the two tables, the data of T14.5, T13, T7.6, T4, T3, and T2 indicate the temperatures at which the glass has a viscosity of $10^{14.5}$ dPa·s, $10^{13}$ dPa·s, $10^{7.6}$ dPa·s, $10^4$ dPa·s, $10^3$ dPa·s, and $10^2$ dPa·s, respectively. For determining the compressive stress CS, exchange depth DoL, and the number of defects after 50 indenter scratch tests, all samples of tables 1 and 2 were chemically tempered for 6 hours in a pure KNO$_3$ melt at 420° C.

The scratch tests were performed at a relative humidity of about 50%. The number of defects from 50 indenter scratch tests herein is the number of visible defects, i.e. those scratches that are rather classified type b) or type d) after the indenter test described above, with a load of 4N on the indenter tip, a traverse speed of 0.4 mm/s, and a displacement of 1 mm. When comparing Tables 1 and 2 it is evident that the number of visually disturbing defects in all of the glasses of the invention is significantly lower than in the comparative examples.

Specifically, in each case of the glass elements of the invention there are less than one quarter of such visually disturbing scratches observed when compared to comparative sample C4 which is still the best performing. And this even though the absolute value of compressive stress is even lower in the glasses of the invention than in the comparative examples, with the exception of samples C2 and C6. In particular, in tempered glass elements according to the invention the number of visible defects is at most ⅕, or not more than 10 (exemplary embodiment 2 in Table 1). In exemplary embodiment 4, the proportion of visible scratches with chipping and with a noticeable width of more than 25 μm is only 6%, in exemplary embodiment 5 even only 2%.

Accordingly, for the exemplary embodiments this means that not more than 25%, in particular not more than 20% of the scratches have a noticeable width including visible chipping of more than 25 μm. Moreover, none of the scratches has a crack 94 running into the glass to a depth of more than 50 μm, or a crack of type c) or d).

Among the not yet tempered glasses, the inventive glasses of the exemplary embodiments tested even have only one tenth or less of visible defects as compared with the non-tempered samples of the tested comparative examples C2, C4, and C6. Therefore, without being limited to the particular compositions of exemplary embodiments 1, 3 and 5, the scratch tolerance of an inventive, chemically temperable glass element 1 of a glass that comprises SiO$_2$, Al$_2$O$_3$, B$_2$O$_3$, and Na$_2$O is such, without or prior to chemical tempering, that when scratches of 1 mm length are introduced using a Knoop diamond indenter which presses upon the glass surface 3 with a force of 4 Newton and is displaced along the surface 3 of the glass element with a traverse speed of 0.4 mm/s, not more than 20%, preferably not more than 15% of the scratches will have a noticeable width including visible chipping of more than 25 μm. Also, none of the scratches will have a crack 94 running into the glass to a depth of more than 50 μm, or a crack of type c) or d).

The glass of sample C4 is closest to the composition preferred according to the invention, but has a higher Na$_2$O content. Also, the fluorine content is greater than 0.2 mol %. In addition, the ratio of B$_2$O$_3$/(Al$_2$O$_3$+ZrO$_2$) is lower in the composition of sample C4, with 0.1388, than the lower limit of the favorable range from 0.18 to 0.55. Accordingly, these deviations already result in a substantially deteriorated scratch tolerance.

In comparative examples C1, C2, C6, and C7, the Al$_2$O$_3$ content is lower and the content of MgO is higher than preferred according to the invention, inter alia.

Furthermore, the glasses of samples C3 and C5 are free of borate, B$_2$O$_3$, like the glasses of samples C1, C2, and C7, and therefore differ from the invention in this regard.

Figure 14:
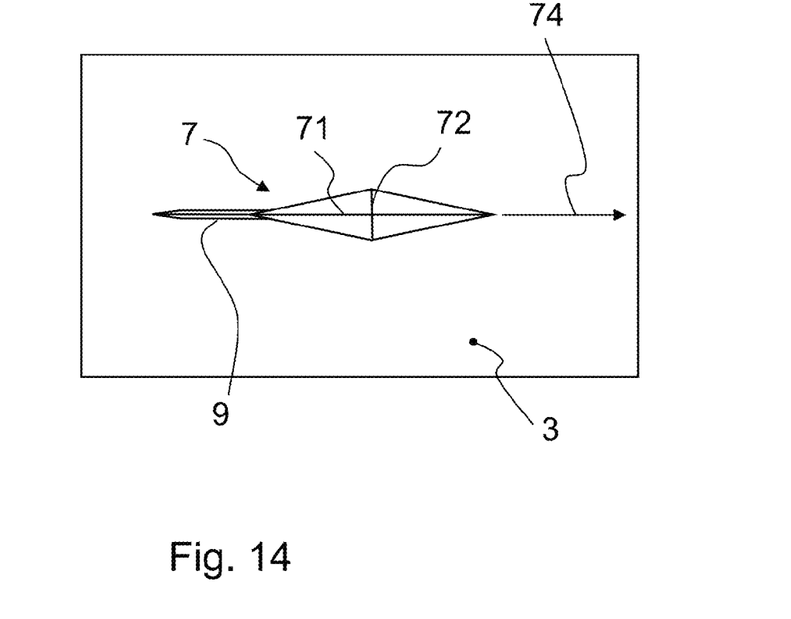
FIG. 14 illustrates the setup of a scratching test using a Knoop indenter.

FIG. 14 shows the exact setup of the scratch test using a Knoop indenter. The indenter tip 7 is illustrated in a plan view in FIG. 14. The employed Knoop indenter has a rhombohedral tip 7 and accordingly has a major edge 71 and a minor edge 72. The contact force of 4 N selected for the scratch test according to the invention acts perpendicular to the representation plane in the view of FIG. 14. Rhombohedral tip 7 is guided along major edge 71, i.e. in a direction 74 (or opposite thereto) along glass surface 3 which is in parallel to the representation plane, in order to introduce a scratch 9 into glass surface 3.

Figure 15:
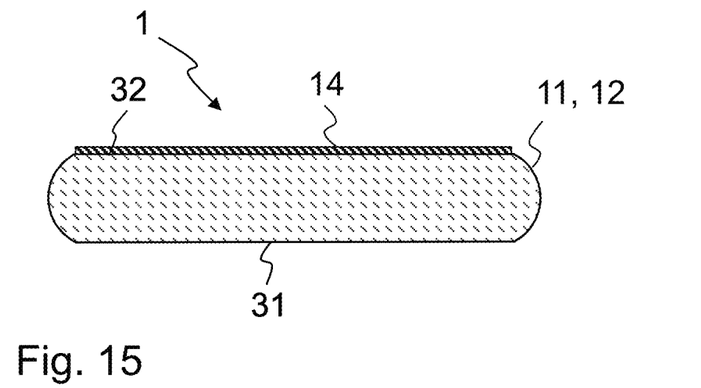
FIGS. 15 to 17 are schematic sectional views of different embodiments of sheet-like glass elements.
Figure 16:
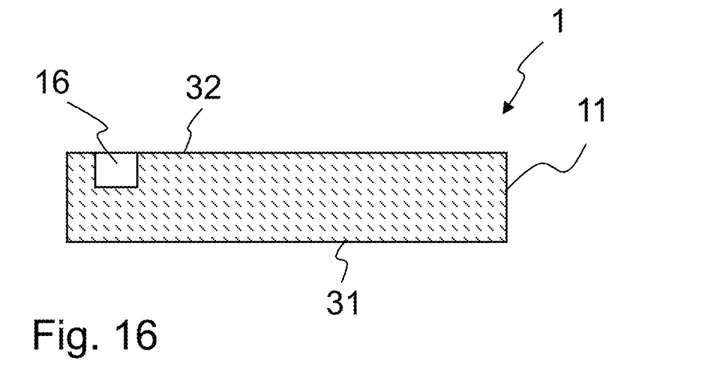
Figure 17:
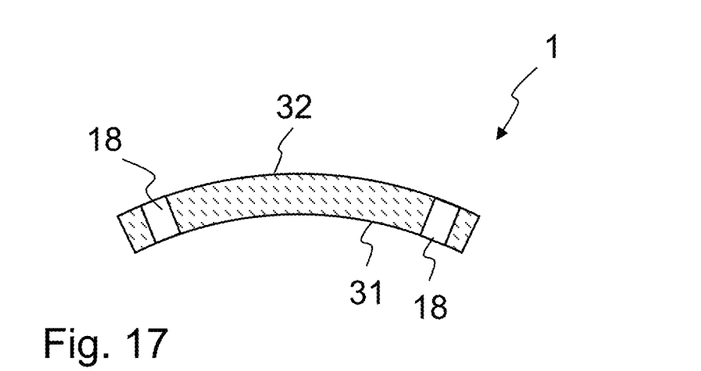

FIGS. 15 to 17 illustrate embodiments of glass elements 1 according to the invention. In the embodiment shown in FIG. 15, machining of the edges has been performed in addition to the cutting to the final format. Specifically, edge 11 of sheet-like glass element 1 is formed as a C-edge 12 of rounded shape. C-edge is preferably produced prior to chemical tempering, by grinding or milling.

According to another embodiment, one or both faces 31, 32 of the sheet-like glass element or glass pane may be provided with a coating 14. Such a coating 14 may be a hard coating, an anti-reflective coating, an anti-fingerprint coating, an oleophobic coating, a printing, or a conductive coating, inter alia.

Also, the coating may be a semi-conductive coating, for example, to be used as a solar cell. Coating 14 may be provided over the entire surface or may be patterned.

In the embodiment shown in FIG. 16, edge 11 has been left in the as-cut state and therefore it is substantially straight.

In another embodiment, the glass element 1 shown in FIG. 16 has a depression 16 in a face 32. Depression 16 may for example be a milled recess. This recess may be introduced by CNC machining, in which case the maximum crack depth of microcracks remains limited to 30 μm in the area of the milled recess. Other possibilities of patterning the surface of the glass element include etching or sandblasting, for example.

Finally, FIG. 17 shows an exemplary embodiment of a glass element 1 in the form of a bent glass sheet. In another embodiment, the glass sheet has openings or bores 18. These may be introduced by drilling, milling, sandblasting, or etching prior to the tempering of glass element 1.

What is claimed is:

1. A glass element comprising:

a glass comprising the following components, in mole percent:

| | |
|---|---|
| $SiO_2$ | 56-70%, |
| $Al_2O_3$ | 10.5-16%, |
| $B_2O_3$ | 2.5-9%, |
| $Na_2O$ | 10-15%, |
| $K_2O$ | 1-4.5%, |
| $ZrO_2$ | 0.1-2.1%, and | a quotient $B_2O_3/(Al_2O_3+ZrO_2)$ of a content of $B_2O_3$ and a total content of $Al_2O_3$ and $ZrO_2$ has a value in a range from 0.18 to 0.55, wherein the glass has a scratch tolerance prior to chemical tempering that when scratches of 1 mm length are introduced using a Knoop diamond indenter which presses upon a surface of the glass with a force of 4 Newton and is displaced along the surface with a traverse speed of 0.4 mm/s, not more than 20% of the scratches have a noticeable width including visible chipping of more than 25 μm.

2. The glass element as in claim 1, wherein the scratch tolerance is such that none of the scratches have a crack running into the glass to a depth of more than 50 μm.

3. The glass element as claimed in claim 1, wherein the glass has a composition comprising the following components, in mole percent:

| | |
|---|---|
| 57-69% | $SiO_2$; |
| 11-15.6% | $Al_2O_3$; |
| 3-8% | $B_2O_3$; |
| 11-15% | $Na_2O$; |
| 0-5% | MgO; |
| 0.1-1.5% | $ZrO_2$; |
| 0-1.5% | $TiO_2$; |
| 0-0.1% | $CeO_2$; |
| 0-0.3% | $SnO_2$; |
| 0-1.5% | $P_2O_5$; and |
| 0-1% | of other components, with a content of $Li_2O$ being less than 0.05%. |

4. The glass element as claimed in claim 1, wherein the glass has a composition comprising the following components, in mole percent:

| | |
|---|---|
| 59-68% | $SiO_2$; |
| >12-15.6% | $Al_2O_3$; |
| 3-8% | $B_2O_3$; |
| 11-15% | $Na_2O$; |
| 0-5% | MgO; |
| 0.1-1.5% | $ZrO_2$; |
| 0-1.5% | $TiO_2$; |
| 0-0.1% | $CeO_2$; |
| 0-0.3% | $SnO_2$; |
| 0-1.5% | $P_2O_5$; |
| 0-2% | ZnO; and |
| 0-1% | of other components. |

5. The glass element as claimed in claim 1, wherein the glass has a sheet-like shape.

6. The glass element as claimed in claim 1, wherein the glass is substantially free of coloring components.

7. The glass element as claimed in claim 1, wherein the glass has a total proportion of 3d transition metals with coloring ionic species that is smaller than 0.1 mol %.

8. The glass element as claimed in claim 1, wherein the glass has a working point at which it has a viscosity of $10^4$ dPa·s at a temperature of less than 1300° C.

9. The glass element as claimed in claim 1, wherein the glass has a glass transition temperature above 580° C.

10. The glass element as claimed in claim 1, wherein the quotient $B_2O_3/(Al_2O_3+ZrO_2)$ has a value in a range from 0.2 to 0.5.

11. The glass element as claimed in claim 1, wherein the quotient $B_2O_3/(Al_2O_3+ZrO_2)$ has a value in a range from 0.22 to 0.47.

12. The glass element as in claim 1, wherein the glass has a composition comprising the following components, in mole percent:

| | |
|---|---|
| 0-6% | MgO; |
| 0-2.1% | $TiO_2$; |
| 0-0.1% | $CeO_2$; |
| 0-0.3% | $SnO_2$; |
| 0-1.5% | $P_2O_5$; |
| 0-2% | ZnO; |
| 0-<0.2% | $Li_2O$; and |
| 0-2% | of other components, with a content of fluoride of less than 0.2%. |

13. The glass element as in claim 12, wherein the content of fluoride is less than 0.05%.

14. The glass element as claimed in claim 12, wherein, in the composition, at least one of the following conditions is met:

a total content of components $Al_2O_3$, $ZrO_2$, $TiO_2$ is in a range from 10.6% to 18.1%;

a total content of components $Al_2O_3$ and $B_2O_3$ is in a range from 13% to 23%;

a total content of components $ZrO_2$ and $TiO_2$ is in a range from 0.1% to 2.1%;

a total content of components $Na_2O$ and $K_2O$ is in a range from 11% to 17%;

a content of each of components CaO, SrO, and BaO is not greater than 0.1%, and a total content of components CaO, SrO, and BaO is not greater than 0.2%.

15. The glass element as claimed in claim 12, wherein, in the composition, the following condition is met:

a quotient $(B_2O_3+Al_2O_3+ZrO_2)/(Na_2O+K_2O+MgO)$ of a total content of components $B_2O_3$, $Al_2O_3$, $ZrO_2$ and a total content of components $Na_2O$, $K_2O$, MgO has a value in a range from 0.95 to 1.55.

16. The glass element as claimed in claim 1, wherein the glass, after chemical tempering, has sodium ions that are at least partially exchanged for potassium ions so that a compressive stress zone is provided at the surface of the glass, wherein the compressive stress is at least 700 MPa and an exchange depth of alkali ions is at least 25 μm.

17. The glass element as claimed in claim 16, wherein the compressive stress zone is at least 750 MPa and the exchange depth of alkali ions is at least 30 μm.

18. The glass element as claimed in claim 16, wherein the compressive stress zone is greater than 800 MPa and the exchange depth of alkali ions is at least 35 μm.

19. A glass element comprising a glass comprising, in mole percent:

| | |
|---|---|
| $SiO_2$ | 56-70%, |
| $Al_2O_3$ | 10.5-16%, |
| $B_2O_3$ | 2.5-9%, |
| $Na_2O$ | 10-15%, |
| $K_2O$ | 1-4.5%, |
| $ZrO_2$ | 0.1-2.1%, | a total content of components $Al_2O_3$ and $B_2O_3$ is in a range from 13% to 23%, and
a total content of components $Na_2O$ and $K_2O$ is in a range from 11% to 17%.

* * * * *